: US 6,516,932 B2
(45) Date of Patent: Feb. 11, 2003

(12) United States Patent
Bulgrien

(54) ELECTRO-HYDRAULIC CLUTCH HYSTERESIS COMPENSATION

(75) Inventor: Garth H. Bulgrien, Ephrata, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/964,613

(22) Filed: Sep. 28, 2001

(65) Prior Publication Data

US 2002/0038750 A1 Apr. 4, 2002

Related U.S. Application Data

(60) Provisional application No. 60/236,155, filed on Sep. 29, 2000, and provisional application No. 60/240,795, filed on Oct. 17, 2000.

(51) Int. Cl.$^7$ .............................................. F16D 48/06
(52) U.S. Cl. ................... 192/109 F; 192/85 R
(58) Field of Search ..................... 192/109 F, 85 R; 91/358 R; 701/67, 68

(56) References Cited

U.S. PATENT DOCUMENTS

| 1,851,596 | A | * | 3/1932 | Reynolds ............... 73/861.71 |
| 3,344,797 | A | * | 10/1967 | Gransten ................... 137/613 |
| 3,943,973 | A | * | 3/1976 | Zettergren ............ 137/624.15 |
| 4,363,999 | A | * | 12/1982 | Preikschat .................... 318/53 |
| 4,911,125 | A | * | 3/1990 | Sugawara et al. .......... 123/399 |
| 4,967,557 | A | * | 11/1990 | Izumi et al. .................. 60/423 |
| 4,982,710 | A | * | 1/1991 | Ohta et al. .................. 123/399 |
| 4,989,471 | A | | 2/1991 | Bulgrien |
| 5,083,648 | A | | 1/1992 | Bulgrien |
| 6,471,025 | B2 | * | 10/2002 | Konrad ................ 192/85 CA |

* cited by examiner

Primary Examiner—Rodney H. Bonck
(74) Attorney, Agent, or Firm—Larry W. Miller; John William Stader

(57) ABSTRACT

In a transmission system having hydraulic clutches controlled by solenoids, the clutch inching characteristics are improved by compensating for clutch hysteresis. A window or range of clutch pedal positions is established and when the clutch pedal operates within the established range, the signal that energizes the solenoid controlling the clutch is modified to offset clutch hysteresis. The window moves as the clutch pedal is released or depressed so that the clutch pedal position falls within the window whenever the direction of pedal movement is reversed. The arrangement is such that, for any given pedal position, the signal applied to the clutch solenoid is greater when the pedal is being released than when it is being depressed.

6 Claims, 3 Drawing Sheets

ELECTRO-HYDRAULIC CLUTCH HYSTERESIS COMPENSATION

RELATED APPLICATIONS

This application claims benefit of provisional application No. 60/236,155 filed Sep. 29, 2000, and No. 60/240,795 filed Oct. 17, 2000. The disclosures of the above applications, as well as the disclosures of my prior applications Ser. Nos. 645,172 and 521,808, now U.S. Pat. Nos. 5,083,648 and 4,989,471, respectively, are incorporated herein by reference.

FIELD OF THE INVENTION

This invention relates to electro-hydraulic clutches and more particularly to a method and apparatus for compensating for hysteresis in such clutches to improve their inching characteristics.

BACKGROUND OF THE INVENTION

In a typical tractor using electro-hydraulic clutches, movement of a clutch pedal controls generation of a signal that is applied to the solenoid of a solenoid-actuated valve, the valve in turn controlling hydraulic pressure in a clutch to vary torque transmission through the clutch from an engine to the wheels. The clutches exhibit hysteresis primarily due to the solenoid valve. That is, the response of a clutch to a given magnitude signal applied to the solenoid is different depending on whether the signal is increasing or decreasing. Although undesirable, hysteresis is not a problem when the rate of signal change versus clutch pedal position is high. However, it is common to use a very low rate of signal change vs. clutch pedal position in the lower portion of the range of clutch pedal travel to provide fine control for maneuvering the tractor. Because of this, any hysteresis in the system makes it difficult to "inch" the tractor. To illustrate the problem, assume a clutch pedal has been released to a point where any further release will result in tractor movement. If the pedal is then further released a small distance the tractor begins to move. To stop the tractor, the clutch pedal must be depressed a greater distance than the small distance which initiated movement.

SUMMARY OF THE INVENTION

An object of the present invention is to provide a method and apparatus for compensating for hysteresis in electro-hydraulic clutches.

Another object of the invention is to provide a method of compensating for hysteresis in an electro-hydraulic clutch having a solenoid controlling a valve that in turn controls hydraulic pressure in the clutch, the method comprising: sensing the position of a clutch pedal and generating, from the sensed clutch pedal position a value defining the magnitude of a signal to be applied to said solenoid; establishing a window having a top limit and bottom limit defining a range of positions of a clutch pedal; moving the window so that the top limit coincides with the sensed clutch pedal position when the clutch pedal is being released; and modifying said value when a sensed position of the clutch pedal is not greater than the top limit.

A further object of the invention is to provide an apparatus for carrying out a method as described above.

According to the method of the invention, the gain in the signal applied to a clutch solenoid is increased when the direction of clutch pedal movement changes. This is accomplished by establishing an anti-hysteresis window representing a range of clutch pedal positions. When the clutch pedal is operating within the window, the gain is relatively high. If the clutch pedal moves outside the window, the window is dragged along with the pedal so that the pedal will be operating within the window as soon as the direction of pedal travel changes.

DESCRIPTION OF THE INVENTION

Figure 1:
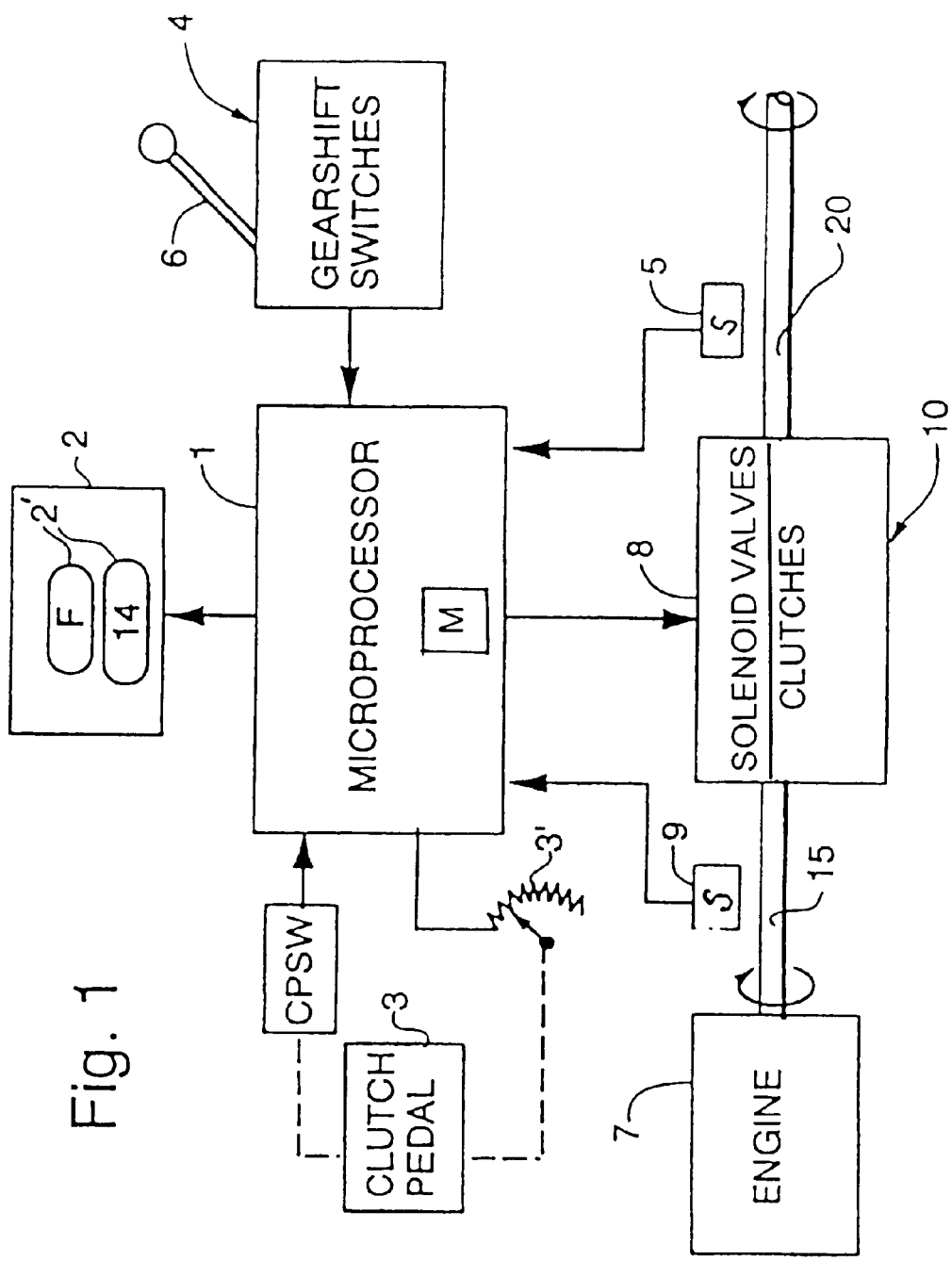
FIG. 1 shows a control system for controlling an electro-hydraulic clutch transmission to selectively connect the engine of a tractor to an output shaft at different gear ratios.

FIG. 1 illustrates a shuttle shift transmission system having a transmission 10 for transmitting torque from a tractor engine 7 to an output shaft 20 that drives the tractor wheels (not shown). This transmission system is disclosed in my above-mentioned patents to which reference may be made for a complete description. Briefly, an operator moves a gearshift lever 6 to operate gearshift switches 4. A microprocessor 1 senses the switches to determine which clutches in transmission 10 are to be actuated to produce the selected gear ratio between the engine output shaft 15 and the transmission output shaft 20. A clutch pedal 3 operates a potentiometer 3' so that an analog signal representing clutch pedal position is applied to the microprocessor. The microprocessor converts the analog signal to a digital value CL_PED_POS that is used to address a table of values in a memory M. As the clutch pedal is moved, the memory outputs a sequence of digital values (TABLE_VALUE) that are converted to modulation of a pulse width modulated (PWM) signal. The PWM signal is applied to solenoids of solenoid valves 8, These valves control the flow of hydraulic fluid to the clutches to set clutch pressure.

Figure 2:
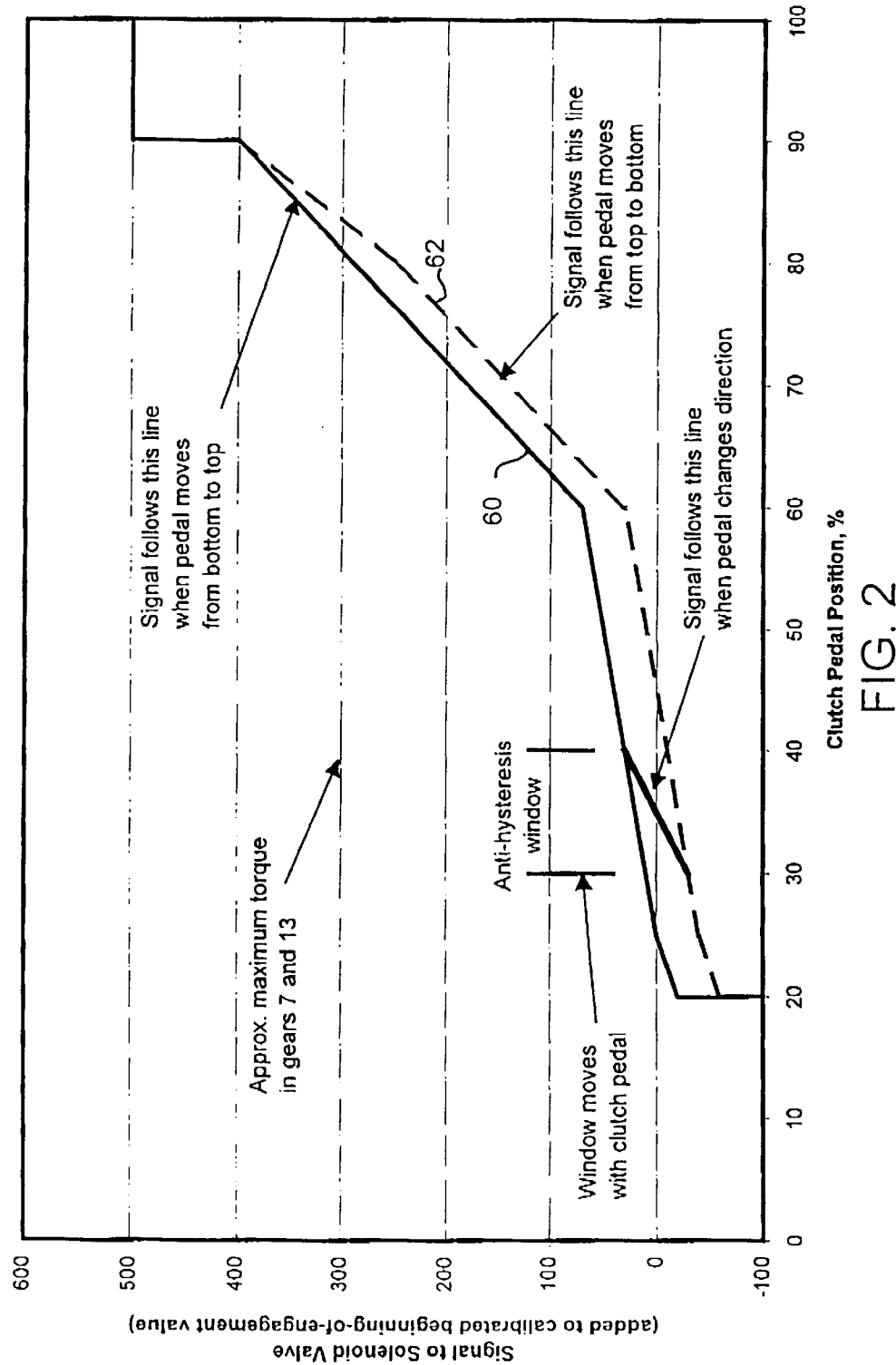
FIG. 2 is a graph useful in explaining the method of compensating for clutch hysteresis; and, FIG. 3 is a flow diagram illustrating a microprocessor routine for practicing the invention.

FIG. 2 is a graph illustrating my method of compensating for clutch hysteresis. FIG. 2 is drawn for the specific case of an electro-hydraulically actuated clutch wherein hydraulic flow to the clutch to increase clutch pressure varies directly with respect to the magnitude of a current signal applied to the clutch solenoid, the current being controlled by pulse width modulation (PWM) of the voltage to the solenoid. However, the principles of my invention are equally applicable to clutches wherein the signal applied to the clutch solenoid is a signal of varying duty cycle or voltage, or to clutches as described in Bulgrien et al. U.S. Pat. No. 5,083,648 wherein hydraulic fluid flow to a clutch to increase clutch pressure varies inversely with respect to the magnitude of the signal applied to the clutch solenoid. For the specific case shown in FIG. 2, the numbers along the vertical axis indicate the magnitude of the solenoid current above the current required to begin engagement of the clutch. On the horizontal axis the clutch pedal position is plotted as a percentage of total clutch pedal travel measured from the fully depressed pedal position.

The solid-line curve 60 illustrates the signal applied to the solenoid valve when the clutch pedal is moving from its most depressed position toward its top or fully released position. According to the present invention, and to compensate for clutch hysteresis, the signal applied to the solenoid valve does not follow curve 60 as the clutch pedal is depressed but instead is made to follow the broken-line curve 62. Thus, for any given clutch pedal position, the signal applied to the solenoid valve is greater when the pedal is being released than when the pedal is being pressed.

An anti-hysteresis window 64 is established to control transitioning of the solenoid valve signal between the values represented by curve 62 and the values represented by curve 60. Window 64 has a width defining a range of clutch pedal positions. This width is illustrated in FIG. 2 as being on the order of 10% of the total range of clutch pedal positions, but the width may be more or less than 10%.

When the clutch pedal is being released, the window 64 is moved so that TOP_OF_WINDOW (the uppermost limit of the range of pedal positions within the window) always coincides with the sensed clutch pedal position. When the clutch pedal is being depressed, the window is not moved until the clutch pedal position is below the window, at which time the window is moved so that the bottom of the window corresponds to the pedal position.

As previously explained, with reference to FIG. 1, the clutch pedal position is sensed and used to access a table value representing the magnitude of the PWM signal that is applied to the solenoid of the clutch valve. According to the present invention, when the sensed clutch pedal position does not coincide with the top of window 64, the table value is modified before conversion to the PWM signal, effectively applying an offset to the PWM signal. The table value is modified by subtracting therefrom an offset value obtained by first determining the difference between the TOP_OF_WINDOW and the current pedal position CL_PED_POS, and multiplying the difference by a gain factor K. Thus, for clutch pedal positions within the window, the PWM signal to the solenoid valve follows the line segment 66 where the gain factor K determines the slope of the line segment.

Figure 3:
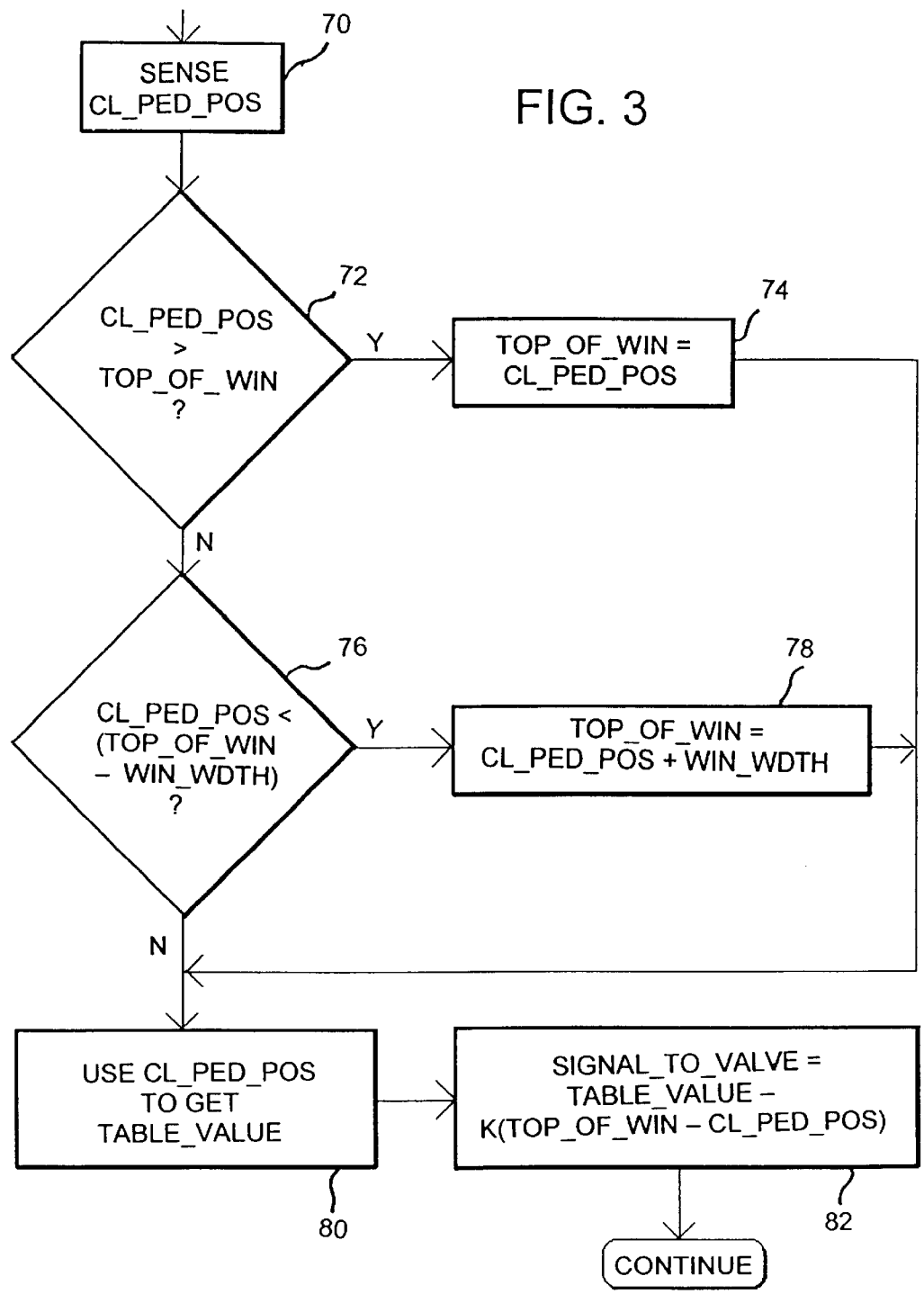

FIG. 3 illustrates a routine for moving window 64 and generating the signals that are applied to the solenoids of the electro-hydraulic valves controlling the inching clutch or clutches in the transmission 10. The routine shown in FIG. 3 is cyclically executed by microprocessor 1. It will be understood that the steps of this routine may be incorporated into clutch control programs such as the one illustrated in the above-mentioned patents. In order to simplify the following explanation of FIG. 3, it will be assumed that transmission 10 has a single inching clutch.

At step 70, the current clutch pedal position is determined by sensing the analog output signal from potentiometer 3' and converting it to a digital value which is saved at a memory location CL_PED_POS. At step 72, the current clutch pedal position is compared with a value TOP_OF_WIN representing the clutch pedal position of the top of window 64 on the preceding cycle of execution of the routine. If CL_PED_POS is greater than TOP_OF_WIN, it means that the pedal is being released and its position no longer falls within the window. In this case, step 74 is executed to set location TOP_OF_WIN equal to the current pedal position. In FIG. 2, this has the effect of moving window 64 to the right so that the top of the window is positioned at the current pedal position.

After completion of step 74, CL_PED_POS is used (step 80) to access a table in the memory of microprocessor 1 to obtain a value TABLE_VALUE. This table holds values which, when converted to modulation values, define the curve 60 in FIG. 2. That is, these values determine the duty cycle of the PWM signal applied to the solenoid valve controlling fluid flow to the clutch. The conversion takes place at step 82. However, before the conversion takes place, TABLE_VALUE may be modified at step 82 where the value K(TOP_OF_WIN−CL_PED_POS) is subtracted from it. K is the gain factor discussed above. In the present case (CL_PED_POS>TOP_OF_WIN at step 72), the subtraction produces no change because TOP_OF_WIN was set equal to CL_PED_POS at step 74. Therefore, as a final event in step 82, the microprocessor 1 generates and applies to the solenoid controlling the inching clutch valve in transmission 10 a PWM signal determined by TABLE_VALUE only. As long as the release of the clutch pedal continues, steps 70, 72, 74, 80 and 82 are repeated and the window 64 is moved to the right.

Assume now that the clutch pedal position is not changed, or is depressed so that its position is within the window 64. In this case step 72 determines that CL_PED_POS is not greater than TOP_OF_WIN so step 76 is executed. A constant, WIN_WDTH, defining the width of window 64, is stored in a non-volatile memory in microprocessor 1. Step 76 subtracts WIN_WDTH from TOP_OF_WIN and then compares the result with CL_PED_POS. In other words, step 76 determines if the clutch pedal is positioned within the window, or has been depressed to a position lower than the bottom of the window. Since the pedal position is assumed to be within the window, the routine proceeds to execute steps 80 and 82. At this time TOP_OF_WIN has a value corresponding to the highest position to which the clutch was released. Step 82 first subtracts CL_PED_POS from TOP_OF_WIN and then multiplies the difference by the gain factor K. The result is subtracted from TABLE_VALUE and this result is used to generate the PWM signal that is then applied to the solenoid of the valve controlling the clutch.

Steps 70, 72, 76, 80 and 82 are repeated as long as the clutch pedal position remains within window 64. If the pedal is depressed to a position below the bottom of the window, this condition is detected at step 76 and step 78 is executed to set TOP_OF_WIN at a position corresponding to the current pedal position plus the width of the window. This effectively moves the window to the left in FIG. 2 so that its lower limit corresponds to the current pedal position. After completion of step 78, the routine obtains TABLE_VALUE from memory at step 80 and modifies it at step 82. Since TOP_OF_WIN is now equal to CL_PED_POS+WIN_WDTH, step 82 in effect subtracts K(WIN_WDTH) from TABLE_VALUE and uses the result to generate the PWM signal that is applied to the solenoid of the valve controlling the clutch.

If downward movement of the clutch pedal continues, steps 70, 72, 76, 78, 80 and 82 are repeated. If downward movement is stopped but there is no upward movement of the pedal, this is detected at step 76 so that step 78 is bypassed. Any upward movement of the pedal beyond the top of the window is detected at step 72 and the window is moved so that its top limit is placed at the current pedal position as previously described.

As indicated above, the foregoing explanation of FIG. 3 has been simplified by assuming that the signal SIGNAL_TO_VALVE generated at step 82 is applied to a solenoid valve of a single inching clutch. However, the invention may also be used to advantage in transmissions such as those disclosed in my U.S. Pat. Nos. 4,949,471 and 5,083,648, having three inching clutches.

Although a preferred embodiment has been described to illustrate the principles of the invention, it will be obvious that various modifications and substitutions may be made in the described embodiment without departing from the spirit and scope of the invention as defined by the appended claims.

I claim:

1. A method of compensating for hysteresis in an electro-hydraulic clutch having a solenoid controlling a valve that in turn controls hydraulic flow to control pressure in said clutch, said method comprising:

sensing the position of a clutch pedal and generating, from the sensed clutch pedal position a value defining the magnitude of a signal to be applied to said solenoid;

establishing a window having a top limit and bottom limit defining a range of clutch pedal positions;

moving said window so that said top limit coincides with said sensed clutch pedal position as the clutch pedal is being released; and, modifying said value to modify the magnitude of said signal when a sensed position of said clutch pedal is within said range of positions.

2. The method as claimed in claim 1 wherein, if said clutch pedal is depressed until it is at a position below said bottom limit, said top limit is made equal to the sensed clutch pedal position plus the width of said window.

3. The method as claimed in claim 1 wherein said value is modified by subtracting from said value a quantity equal to the product of a gain factor times the difference between said top limit and the sensed pedal position.

4. Apparatus for compensating for hysteresis in an electro-hydraulic clutch having a solenoid controlling a valve that in turn controls hydraulic flow to control pressure in said clutch, said apparatus comprising:

a sensor for sensing the position of a clutch pedal;

means for generating, from the sensed clutch pedal position a value defining the magnitude of a signal applied to said solenoid;

means defining a window having a top limit and bottom limit defining a range of clutch pedal positions;

means for moving said window so that said top limit coincides with said sensed clutch pedal position as the clutch pedal is being released; and, means for modifying said value to modify the magnitude of said signal when a sensed position of said clutch pedal is within said range of positions.

5. An apparatus as claimed in claim 4 and including means operable if said clutch pedal is depressed until it is at a position below said bottom limit, for setting said top equal to the sensed clutch pedal position plus the width of said window.

6. Apparatus as claimed in claim 4 wherein said means for modifying said value comprises means for subtracting from said value a quantity equal to the product of a gain factor times the difference between said top limit and the sensed pedal position.

* * * * *